United States Patent [19]
Shieh

[11] Patent Number: 5,365,758
[45] Date of Patent: Nov. 22, 1994

[54] LOCK FOR INCAPACITATING MOTORCYCLE DISK BRAKE

[76] Inventor: Jin-Ren Shieh, No. 178, Shih Chia Rd., Taichung, Taiwan, Prov. of China

[21] Appl. No.: 913,966

[22] Filed: Jul. 17, 1992

[51] Int. Cl.⁵ .......................................... B60R 25/00
[52] U.S. Cl. .................................. 70/33; 70/38 R; 70/226; 70/233; 188/265
[58] Field of Search ...................... 70/33, 38 R, 53–56, 70/225, 233, 227, 228, 226; 188/265, 353; 303/89

[56] References Cited

U.S. PATENT DOCUMENTS

| | | | |
|---|---|---|---|
| 716,397 | 12/1902 | Vom Eigen | 292/175 |
| 898,955 | 9/1908 | Ballod | 70/DIG. 1 X |
| 1,674,513 | 6/1928 | Jacobi | 70/380 |
| 1,928,215 | 9/1933 | Steffen | 70/53 |
| 2,104,981 | 1/1938 | Falk | 70/33 |
| 2,656,704 | 10/1953 | Mancuso | 70/33 |
| 4,294,090 | 10/1981 | Metzger | 70/226 |
| 4,409,804 | 10/1983 | Sork | 70/226 X |
| 4,699,406 | 10/1987 | Swanson, Jr. | 292/175 |
| 5,265,451 | 11/1993 | Phifer | 70/233 X |

*Primary Examiner*—Lloyd A. Gall
*Attorney, Agent, or Firm*—Jacobson, Price, Holman & Stern

[57] ABSTRACT

A lock for incapacitating a motorcycle disk brake has a lock body containing a locking bolt, a braking bolt, and a locking and unlocking device. The lock body is provided with a slot to receive a disk brake piece of a motorcycle. The locking and unlocking device has a rotatable core capable of turning between a locking position and an unlocking position. When the rotatable core is situated at the locking position, the braking bolt is at the third position so as to confine the locking bolt to the second position. When locking bolt is situated at the second position, the slot of the lock body is sealed off so as to cause the lock body to fasten securely to the motorcycle disk brake, which is then disabled. When the rotatable core is at an unlocking position, the braking bolt moves from the third position to the fourth position so as to cause the locking bolt to move from the second position to the first position. As a result, the slot of the lock body is no longer sealed off, thereby permitting the lock body to be removed from the motorcycle disk brake to which it is fastened.

4 Claims, 3 Drawing Sheets

LOCK FOR INCAPACITATING MOTORCYCLE DISK BRAKE

BACKGROUND OF THE INVENTION

The present invention relates to a lock, and more particularly to a lock for use in disabling the disk brake of a motorcycle so as to prevent the wheel from turning.

As shown in FIG. 1, a U-shaped padlock 1 of the prior art is commonly used by the motorcyclist to incapacitate the motorcycle so as to prevent it from being stolen. Such U-shaped padlock 1 is generally composed of a U-shaped shackle 2 and a lock body 3. When a motorcycle is in a stationary and parking position, the shackle arms of the padlock 1 are put through the interspaces 4 between the spokes of the front wheel of the motorcycle and are subsequently joined with the lock body 3 so as to prevent the front wheel from turning. Such prior art padlock 1 as described above is defective in that the parked front wheel of the motorcycle intended to be incapacitated may not be so positioned as to facilitate the motorcyclist to put the shackle 2 through the interspaces 4, and that it is too cumbersome and inconvenient to be carried around on the motorcycle.

SUMMARY OF THE INVENTION

It is, therefore, the primary objective of the present invention to provide a lock which can be used conveniently to incapacitate a motorcycle disk brake.

It is another objective of the present invention to provide a lock, which is intended to disable a motorcycle disk brake and is handy to be carried around on the motorcycle.

In keeping with the principles of the present invention, the foregoing objectives of the present invention are accomplished by a motorcycle disk brake lock, which comprises a lock body, a locking bolt, a braking bolt, and a locking and unlocking device. The lock body has a slot so dimensioned as to receive therein the disk brake intended to be disabled. The locking bolt is fastened to the lock body in such a manner that it slides between a first position and a second position. In the absence of an external force, the locking bolt is situated at the first position. When an external force is present, the locking bolt moves from the first position to the second position by traversing the slot. In general, the outer diameter of the locking bolt is smaller than the diameter of the heat-radiating hole of the motorcycle disk brake, so as to permit the locking bolt to pass through the heat-radiating hole at such time when the locking bolt moves from the first position to the second position in order to enable the lock body to make contact with the disk brake. The braking bolt is movably attached to the lock body in such a manner that it moves between a third position and a fourth position. In the absence of an external force, the braking bolt is at the third position so as to confine the locking bolt at the second position. On the other hand, when the braking bolt is exerted upon by an external force, it moves from the third position to the fourth position so as to enable the locking bolt to move back to the first position from the second position. The locking and unlocking device is housed in the lock body and is provided with a rotatable core. When the rotatable core is situated at a locking position, it does not act on the braking bolt, so as to permit the braking bolt to remain at the third position. However, when the rotatable core is situated at an unlocking position, it activates the braking bolt to move from the third position to the fourth position.

In operation, the user of the present invention allows the motorcycle disk brake to be received in the slot of the lock in such a manner that the locking bolt is aligned with a heat-radiating hole of the disk brake. Subsequently, the locking bolt is moved forcibly from the first position to the second position. In the process, the locking bolt traverses the heat-radiating hole of the disk brake so as to enable the lock body to fasten with the disk brake, which is consequently incapacitated.

DETAILED DESCRIPTION OF THE PREFERRED EMBODIMENT

Figure 1:
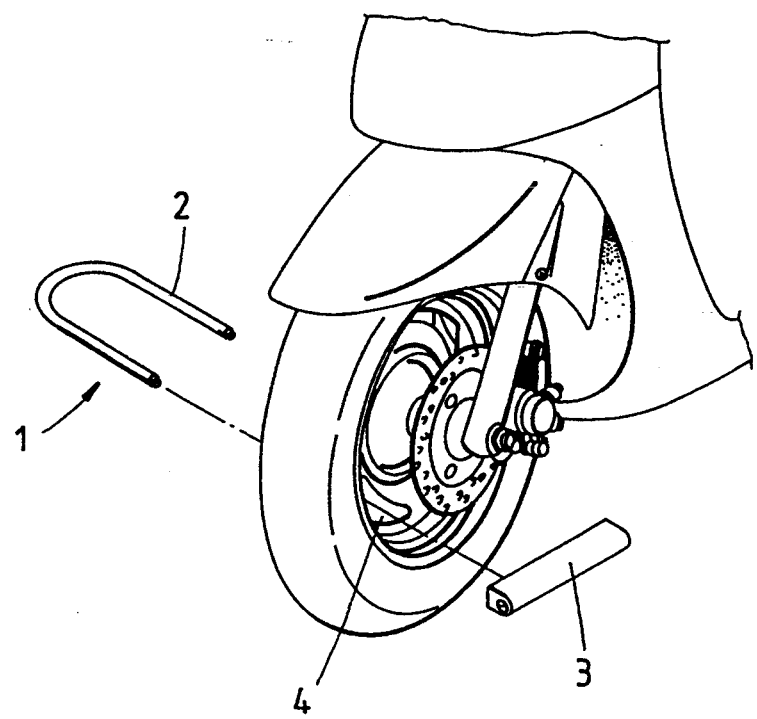
FIG. 1 shows a schematic view of a prior art U-shaped padlock in use.
Figure 2:
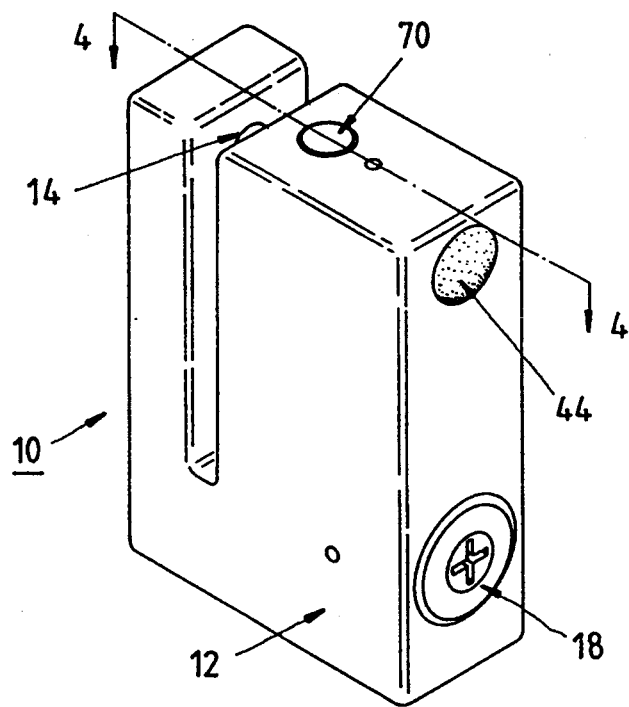
FIG. 2 shows a three-dimensional view of a preferred embodiment of the present invention.
Figure 3:
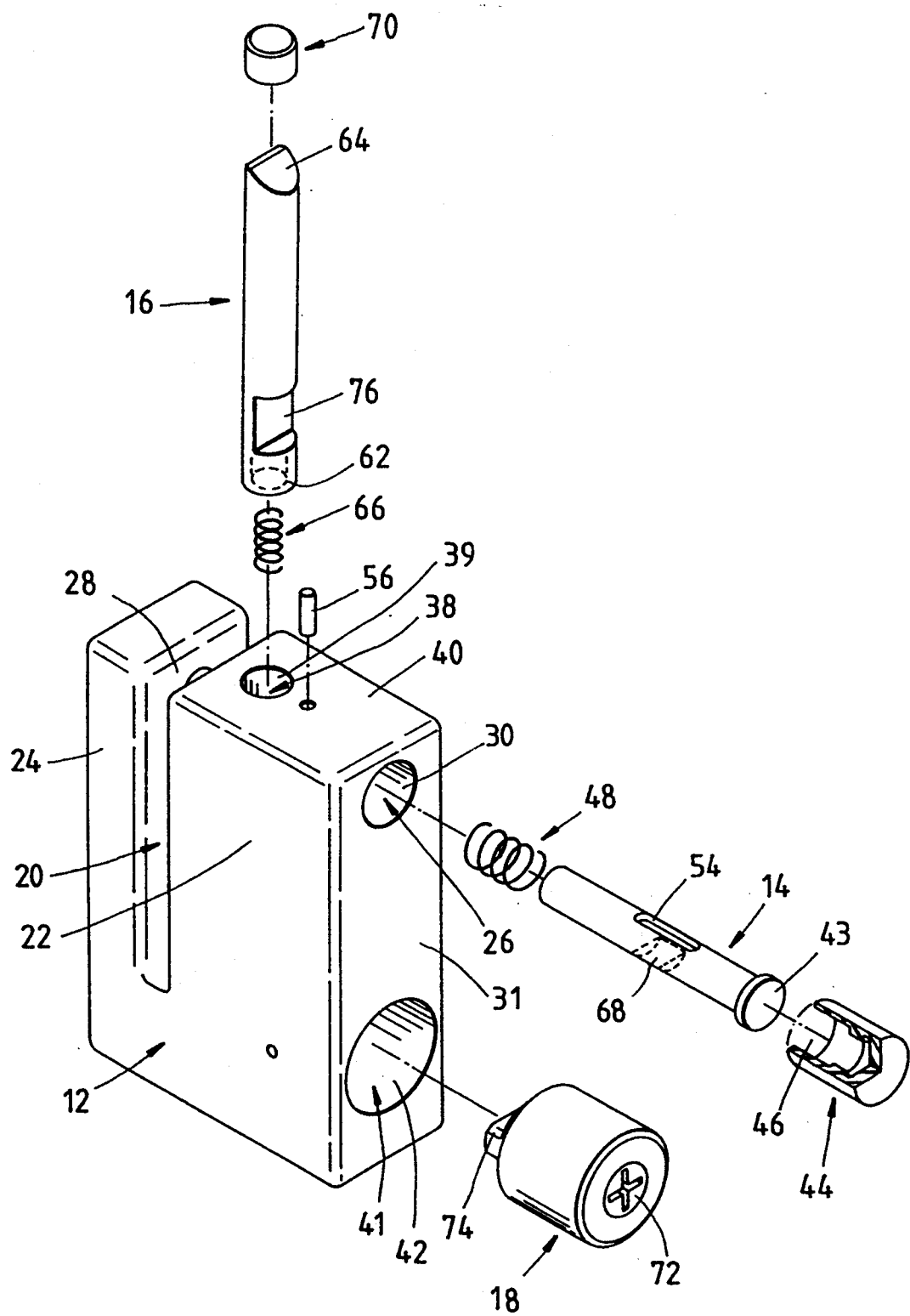
FIG. 3 shows an exploded view of the preferred embodiment of the present invention.

Referring to FIGS. 2-6, a disk brake lock 10 of the present invention is shown to comprise a lock body 12, a locking bolt 14, a braking bolt 16, and a locking and unlocking device 18.

The lock body 12 of metal material is of flat and rectangular construction and provided with a slot 20 dividing the lock body 12 into a first portion 22 and a second portion 24. The first portion 22 is wider than the second portion 24. There is a horizontal through hole 26, which is perpendicular to a longitudinal axis of the slot 20 and adjacent to an open end 28 of the slot 20. The open end 30 of the horizontal through hole 26 is located on a lateral surface 31 of the lock body 12. There are a front segment 32 situated in the first portion 22, a mid-segment 34 having a hole diameter smaller than that of the front segment 32, and a rear segment 36 located in the second portion 24. A vertical through hole 38 is located in the first portion 22 and is normal to the horizontal through hole 26. The open end 39 of the vertical through hole 38 is situated on another lateral surface 40 of the lock body 12. A receiving hole 41 is situated in the first portion 22 in such manners that it remains a predetermined distance from the horizontal through hole 26 and that it is in communication with the vertical through hole 38. The open end 42 of the receiving hole 41 is located on a lateral surface 31.

The locking bolt 14 is inserted into the lock body 12 through the open end 30 of the horizontal through hole 26 and is provided on the outer side thereof with an annular flange 43 intended to hold a plastic cap 44 which is located in the front segment 32 and provided with a recess 46 intended to accommodate a first coil spring 48 encasing the locking bolt 14. The first coil spring 48 is arranged in such manners that its one end urges a bottom wall 50 of the recess 46 and that its another end urges a shoulder 52 located at the junction between the front segment 32 and the mid-segment 34. In addition, the locking bolt 14 is furnished with a strip slot 54. A pin 56 is inserted into a position of the first portion 22 corresponding to the position where the strip slot 54 is located. When the front slot wall 58 of the strip slot 54 is in contact with the pin 56, the locking bolt 14 is situated at the first position. The plastic cap 44 extends partially beyond the open end 30. As soon as there is an external force exerting on the plastic cap 44 so as to cause the rear slot wall 60 of the strip slot 54 to make contact with the pin 56, the locking bolt 14 is said to be at the second position, thereby resulting in the end of the locking bolt 14 to enter the rear segment 36 of the horizontal through hole 26 so as to close the slot 20.

The braking bolt 16 is inserted into the lock body 12 through the open end 39 of the vertical through hole 38 and is provided with a blind hole 62 and a tapered portion 64. A second coil spring 66 is received in the blind hole 62 in such a manner that its one end urges the bottom wall of the vertical through hole 38. The locking bolt 14 is provided with a retaining groove 68 opposite to the tapered portion 64 when the locking bolt 14 is situated at the second position. As a result, the braking bolt 16 can be pushed to be at the third position by the force of the second coil spring 66. At this time, the locking bolt 14 is confined at the second position by virtue of the tapered portion 64 which remains in the retaining groove 68. In manufacturing the lock of the present invention, the open end 39 of the vertical through hole 38 is plugged by means of a cap 70.

The locking and unlocking device 18 has a rotatable core 72, which is beyond the scope of the present invention and will not be therefore further described. The device 18 is disposed in the lock body 12 through the open end 42 of the receiving hole 41. The device 18 is provided with a rectangular projection 74 capable of extending into the vertical through hole 38. The braking bolt 16 has a retaining slot 76 of a length corresponding to the length of the rectangular projection 74 for accommodating the rectangular projection 74. When the rotatable core 72 is at a locking position, the rectangular projection 74 is perpendicular lengthwise to the axis of the braking bolt 16. As a result, the rectangular projection 74 presses the inner slot wall 78 of the retaining slot 76 to cause the braking bolt 16 to move from the third position to the fourth position in order to free the locking bolt 14, which is then able to move back to the first position from the second position so as to seal off the slot 20 by virtue of the fact that the first coil spring 48 is able to exert a force on the locking bolt 14.

Figure 4:
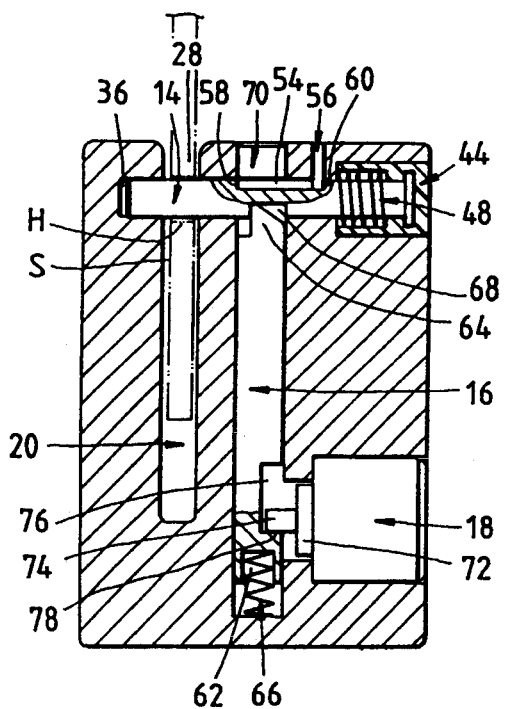
FIG. 4 shows a sectional view of a portion taken along the line 4—4 as shown in FIG. 2, when the preferred embodiment of the present invention is in an unlocked state.
Figure 5:
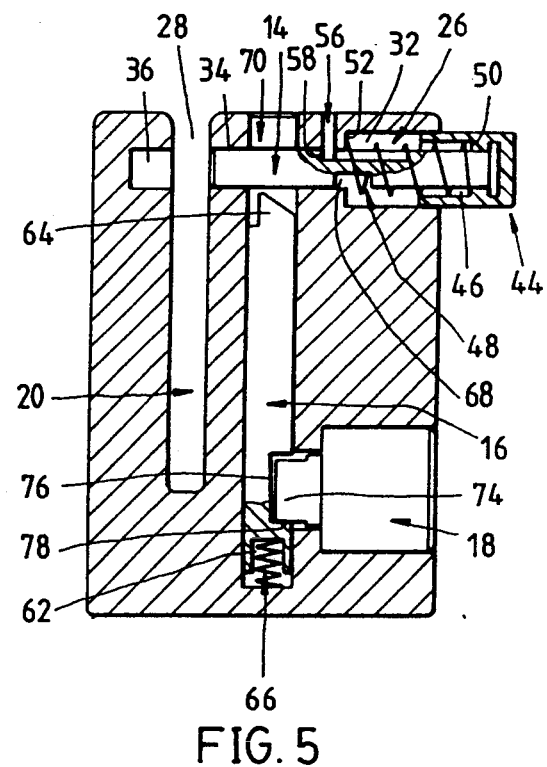
FIG. 5 shows a sectional view of a portion taken along the line 4—4 as shown in FIG. 2, when the preferred embodiment of the present invention is in a locked state.
Figure 6:
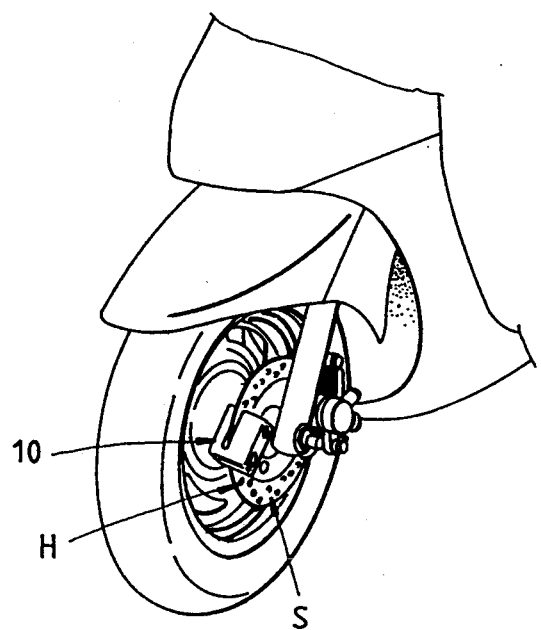
FIG. 6 shows a schematic view of the preferred embodiment of the present invention, which is fastened to a motorcycle disk brake.

In using the motorcycle disk brake lock 10 of the present invention, the slot 20 of the lock body 12 is arranged in such a way that it receives therein the disk brake piece designated as S in FIG. 4. Thereafter, the locking bolt 14 is aligned with a heat-radiating hole designated as H in FIG. 4. The aligned locking bolt 14 is then pressed inward to cause it to move from the first position to the second position. The locking bolt 14 is therefore situated in a position where it traverses the slot 20 permitting its end to extend into the rear segment 36 of the horizontal through hole 26. As a result, the lock body 12 is securely fastened to the disk brake piece S so as to incapacitate the front wheel of the motorcycle. The lock body 12 may be removed from the disk brake to which it is fastened. This is done by turning the rotatable core 72 to situate at the unlocking position by means of a key, so as to actuate the braking bolt 16 to move from the third position to the fourth position. As a result, the locking bolt 14 moves back to the first position from the second position so that the slot 20 is clear to permit the lock body 12 to be removed from the disk brake piece S.

What is claimed is:

1. A lock for incapacitating a motorcycle disk brake having ventilation holes, said lock comprising:

(a) a lock body having a first lateral side, a second lateral side adjacent to said first lateral side, and a slot substantially perpendicular to said first lateral side and extending into said lock body for a predetermined length;

(b) a locking bolt disposed inside said lock body in such manners that it reciprocates between a first position and a second position, and that it is situated at said first position at such time when there is no external force exerting thereon, and further that it is actuated to move from said first position to said second position to seal off an open end of said slot at such time when there is an external force acting on said locking bolt, said locking bolt having a diameter which allows said locking bolt to be passed snugly through one of said ventilation holes in said disk brake, said predetermined length being long enough to receive said disk brake in said slot while allowing said bolt to pass through one of said ventilation holes;

(c) a braking bolt disposed inside said lock body in such manners that it reciprocates between a third position and a fourth position, and that it is situated at said third position so as to confine said locking bolt at said second position at such time when there is no external force exerting on said braking bolt, and further that said braking bolt moves from said third position to said fourth position to release said locking bolt so as to move back to said first position at such time when there is an external force acting on said braking bolt; and (d) a locking and unlocking device disposed in said lock body and provided with a rotatable core, which confines said braking bolt to said fourth position at such time when said rotatable core is situated at an unlocking position of said device, and which releases said braking bolt to move to said third position at such time when said rotatable core is situated at a locking position of said device;

wherein said lock body is of substantially flat rectangular construction, and wherein said slot extends into said lock body from said first lateral side of said lock body in such a manner that it is parallel to said second lateral side of said lock body so as to divide said lock body into a first portion and a second portion, with said first portion being wider than said second portion;

wherein said lock body has a horizontal through hole, which traverses said lock body in such manners that it is parallel to said first lateral side and that it traverses said slot having an open end situated in said first lateral side, said horizontal through hole being divided into a front segment situated in said first portion, a mid-segment situated in said first portion and having an outer diameter smaller than that of said front segment, and a rear segment situated in said second portion;

wherein said locking bolt has a portion which is located at said front segment and is provided with a plastic cap having a recess to accommodate therein a first coil spring which has one end urging a shoulder formed by said front segment and said mid-segment and which has another end urging a bottom surface of said recess;

wherein said locking bolt includes a strip slot situated at said first position at such time when said locking bolt is pushed by said first coil spring until a front slot wall of said strip slot is in contact with a pin located at a position corresponding to said mid-segment of said horizontal through hole; and wherein said locking bolt is situated at said second position at such time when said locking bolt is acted on by an external force until a rear slot wall of said strip slot is in contact with said pin, with a rear end of said locking bolt extending into said rear segment of said horizontal through hole.

2. The lock for incapacitating a motorcycle disk brake of claim 1, wherein said locking bolt includes an intermediately disposed recess; wherein said first portion of said lock body is provided with a vertical through hole parallel to said slot and normal to said horizontal through hole, with said vertical through hole having an open end situated in said first lateral side; wherein said braking bolt is disposed in said lock body via said open end of said vertical through hole in such a manner that a second coil spring is permitted to be received in a space located between an inner end of said braking bolt and a bottom surface of said vertical through hole; wherein said braking bolt is provided on an outer end thereof with a projected portion which is situated oppositely to said recess of said locking bolt at such time when said locking bolt is situated at said second position; wherein said braking bolt is urged by said second coil spring to locate at said third position at such time when said braking bolt is not acted on by an external force, with said projected portion extending into said recess of said locking bolt so as to confine said locking bolt to said second position; and wherein said braking bolt moves from said third position to said fourth position by an external force so that said projected portion of said braking bolt moves out of said recess of said locking bolt, which is subsequently allowed to move back to said first position from said second position.

3. The lock for incapacitating a motorcycle disk brake of claim 2 wherein said first portion of said lock body is provided with a receiving hole which is parallel to said horizontal through hole and has an end in communication with said vertical through hole, and which accommodates therein said locking and unlocking device provided with said rotatable core having a rectangular projection capable of extending into said vertical through hole and located at a position opposite to a retaining slot of said braking bolt, with said rectangular projection extending into said retaining slot in such a manner that it is perpendicular to a longitudinal axis of said braking bolt so as to release said braking bolt and permit said braking bolt to remain at said third position at such time when said rotatable core is situated at said locking position, and with said rectangular projection extending into said retaining slot in such a manner that it is parallel to said longitudinal axis of said braking bolt so as to bear against said braking bolt and urge said braking bolt against said second coil spring in order to move from said third position to said fourth position at such time when said rotatable core is situated at said unlocking position.

4. A lock for incapacitating a motorcycle disk brake having ventilation holes, said lock comprising:

(a) a substantially flat rectangular lock body having a first lateral side, a second lateral side adjacent and substantially perpendicular to said first lateral side, and a slot substantially perpendicular to said first lateral side and extending into said lock body for a predetermined length, said slot extending into said lock body from said first lateral side of said lock body in such a manner that it is parallel to said second lateral side of said lock body so as to divide said lock body into a first portion and a second portion, with said first portion being wider than said second portion, said second portion having dimensions which enable said second portion to fit between said motorcycle disk brake and a wheel of said motorcycle;

(b) a locking bolt disposed inside said lock body in such manners that it reciprocates between a first position and a second position, and that it is situated at said first position at such time when there is no external force exerting thereon, and further that it is actuated to move from said first position to said second position to seal off an open end of said slot at such time when there is an external force acting on said locking bolt, said locking bolt having a diameter which allows said locking bolt to be passed snugly through one of said ventilation holes in said disk brake, said predetermined length being long enough to receive said disk brake in said slot while allowing said locking bolt to pass through one of said ventilation holes;

(c) a braking bolt disposed inside said lock body in such manners that it reciprocates between a third position and a fourth position, and that it is situated at said third position so as to confine said locking bolt at said second position at such time when there is no external force exerting on said braking bolt, and further that said braking bolt moves from said third position to said fourth position to release said locking bolt so as to move back to said first position at such time when there is an external force acting on said braking bolt; and (d) a locking and unlocking device disposed in said lock body and provided with a rotatable core, which confines said braking bolt to said fourth position at such time when said rotatable core is situated at an unlocking position of said device, and which releases said braking bolt to move to said third position at such time when said rotatable core is situated at a locking position of said device;

wherein said lock body includes a horizontal through hole, which traverses said lock body in such manners that it is parallel to said first lateral side and traverses said slot having an open end situated in said first lateral side, said horizontal through hole being divided into a front segment situated in said first portion, a mid-segment situated in said first portion and having an outer diameter smaller than that of said front segment, and a rear segment situated in said second portion; wherein said locking bolt has a portion which is located at said front segment and is provided with a plastic cap having a recess to accommodate therein a first coil spring which has one end urging a shoulder formed by said front segment and said mid-segment and which has another end urging a bottom surface of said recess; wherein said locking bolt includes a strip slot situated at said first position at such time when said locking bolt is pushed by said first coil spring until a front slot wall of said strip slot is in contact with a pin located at a position corresponding to said mid-segment of said horizontal through hole; and wherein said locking bolt is situated at said second position at such time when said locking bolt is acted on by an external force until a rear slot wall of said strip slot is in contact with said pin, with a rear end of said locking bolt extending into said rear segment of said horizontal through hole;

wherein said locking bolt includes an intermediately disposed recess; said first portion of said lock body is provided with a vertical through hole parallel to said slot and normal to said horizontal through hole, with said vertical through hole having an open end situated in said first lateral side; wherein said braking bolt is disposed in said lock body via said open end of said vertical through hole in such a manner that a second coil spring is permitted to be received in a space located between an inner end of said braking bolt and a bottom surface of said vertical through hole; wherein said braking bolt is provided on an outer end thereof with a projected portion which is situated oppositely to said recess of said locking bolt at such time when said locking bolt is situated at said second position; wherein said braking bolt is urged by said second coil spring to locate at said third position at such time when said braking bolt is not acted on by an external force, with said projected portion extending into said recess of said locking bolt so as to confine said locking bolt to said second position; and wherein said braking bolt moves from said third position to said fourth position by an external force so that said projected portion of said braking bolt moves out of said recess of said locking bolt, which is subsequently allowed to move back to said first position from said second position; and wherein said first portion of said lock body is provided with a receiving hole which is parallel to said horizontal through hole and has an end in communication with said vertical through hole, and which accommodates therein said locking and unlocking device provided with said rotatable core having a rectangular projection capable of extending into said vertical through hole and located at a position opposite to a retaining slot of said braking bolt, with said rectangular projection extending into said retaining slot in such a manner that it is perpendicular to a longitudinal axis of said braking bolt so as to release said braking bolt and permit said braking bolt to remain at said third position at such time when said rotatable core is situated at said locking position, and with said rectangular projection extending into said retaining slot in such a manner that it is parallel to said longitudinal axis of said braking bolt so as to bear against said braking bolt and urge said braking bolt against said second coil spring in order to move from said third position to said fourth position at such time when said rotatable core is situated at said unlocking position.

* * * * *